United States Patent
Kim et al.

(10) Patent No.: US 9,547,351 B2
(45) Date of Patent: Jan. 17, 2017

(54) POWER SUPPLY APPARATUS

(71) Applicant: SAMSUNG ELECTRO-MECHANICS CO., LTD., Suwon-Si, Gyeonggi-Do (KR)

(72) Inventors: Jae Kuk Kim, Suwon-Si (KR); Don Sik Kim, Suwon-Si (KR)

(73) Assignees: SAMSUNG ELECTRO-MECHANICS CO., LTD., Suwon-si, Gyeonggi-do (KR); SOLUM CO., LTD., Suwon-si, Gyeonggi-do (KR)

( * ) Notice: Subject to any disclaimer, the term of this patent is extended or adjusted under 35 U.S.C. 154(b) by 217 days.

(21) Appl. No.: 14/296,232

(22) Filed: Jun. 4, 2014

(65) Prior Publication Data

US 2015/0236587 A1 Aug. 20, 2015

(30) Foreign Application Priority Data

Feb. 20, 2014 (KR) .................. 10-2014-0019705

(51) Int. Cl.
*H02M 3/335* (2006.01)
*G06F 1/32* (2006.01)
*H02M 1/00* (2006.01)
*G06F 1/26* (2006.01)

(52) U.S. Cl.
CPC .............. *G06F 1/32* (2013.01); *H02M 3/335* (2013.01); *G06F 1/26* (2013.01); *H02M 2001/0006* (2013.01); *H02M 2001/0032* (2013.01); *Y02B 70/16* (2013.01)

(58) Field of Classification Search
CPC ............ H02M 7/23; H02M 2001/0032; H02M 2001/0067; H02M 2001/0083; H02M 3/33576; H02M 3/33584; Y02B 70/16; Y02B 70/126; G06F 1/32; G06F 1/26
See application file for complete search history.

(56) References Cited

U.S. PATENT DOCUMENTS

| | | | |
|---|---|---|---|
| 5,404,092 A * | 4/1995 | Gegner | H02M 1/4208 323/207 |
| 6,025,999 A | 2/2000 | Farrington et al. | |
| 9,246,396 B2 * | 1/2016 | Hsiao | H02M 3/33523 |

(Continued)

FOREIGN PATENT DOCUMENTS

| | | |
|---|---|---|
| JP | 2000-152654 A | 5/2000 |
| KR | 10-2010-0000482 A | 1/2010 |

(Continued)

*Primary Examiner* — Jessica Han
*Assistant Examiner* — Bart Iliya
(74) *Attorney, Agent, or Firm* — McDermott Will & Emery LLP (57) ABSTRACT

There is provided a power supply apparatus including: a first power supply unit including a transformer switching and transforming an input power, and converting the input power into a first power and providing the first power to a main output terminal and a standby output terminal; a second power supply unit converting the input power into a second power and provide the second power as an operating power of the first power supply unit; and a main switching unit intermitting supplying of the first power from the first power supply unit to the main output terminal.

11 Claims, 5 Drawing Sheets

(56) References Cited

U.S. PATENT DOCUMENTS

| | | | | |
|---|---|---|---|---|
| 2008/0259657 | A1* | 10/2008 | Dikken | H02M 3/33584 363/26 |
| 2009/0244944 | A1* | 10/2009 | Jang | H02J 7/345 363/126 |
| 2011/0074212 | A1* | 3/2011 | Wang | H02M 1/4208 307/31 |
| 2011/0140519 | A1* | 6/2011 | Lo | G06F 1/26 307/24 |
| 2012/0043811 | A1 | 2/2012 | Jeong et al. | |
| 2012/0133299 | A1* | 5/2012 | Capodivacca | H05B 33/0857 315/297 |
| 2013/0076143 | A1* | 3/2013 | Guo | H02J 9/04 307/66 |
| 2013/0162048 | A1 | 6/2013 | Kim et al. | |
| 2015/0200551 | A1* | 7/2015 | Wu | H02J 7/0014 320/103 |

FOREIGN PATENT DOCUMENTS

| | | |
|---|---|---|
| KR | 10-2012-0017347 A | 2/2012 |
| KR | 10-2013-0072559 A | 7/2013 |

\* cited by examiner

POWER SUPPLY APPARATUS

CROSS-REFERENCE TO RELATED APPLICATION

This application claims the benefit of Korean Patent Application No. 10-2014-0019705 filed on Feb. 20, 2014, with the Korean Intellectual Property Office, the disclosure of which is incorporated herein by reference.

BACKGROUND

The present disclosure relates to a power supply apparatus for a server having improved efficiency.

Recently, a large range of electronic apparatuses and appliances such as computers, display devices, various types of control apparatuses, and the like, satisfying various user demands, have been used in domestic, commercial and industrial applications.

Such electronic apparatuses have necessarily included a power supply apparatus disposed in an interior thereof or on an exterior thereof and supplying required driving power in order to perform various operations satisfying various user demands.

Particularly, in an electronic apparatus such as a server that continuously uses a large amount of power, a power supply apparatus has necessarily been used.

Generally, in a power supply apparatus according to the related art, a flyback converter having a simple structure may be used in order to generate standby power. For example, in the power supply apparatus according to the related art, a multi-output flyback converter using multiple windings is mainly used in order to supply a control integrated circuit (IC) power and the standby power. Such a flyback converter has disadvantages in that efficiency may be low due to high voltage stress and hard switching.

The power supply apparatus has a structure in which a standby stage supplies an operating power and a standby power using a direct current (DC) power from a power factor correction (PFC) unit, and a DC/DC stage receives the operating power from the standby stage and supplies a main voltage using the DC power from the PFC unit.

In a power supply apparatus according to the related art, a flyback converter is generally used in the standby stage, and the PFC unit, the DC/DC stage, and the standby stage have efficiencies of 98%, 96%, and 80%, respectively, in a load of 50% in a state in which an input voltage of approximately 230 Vac is input.

In addition, since the flyback converter uses a transformer occupying a large volume, it may significantly decrease entire power density of the power supply apparatus.

RELATED ART DOCUMENT (Patent Document 1) Korean Patent Laid-Open Publication No. 2013-0072559

SUMMARY

An aspect of the present disclosure may provide a power supply apparatus having improved power efficiency.

An aspect of the present disclosure may also provide a power supply apparatus in which a volume of an operating power supply unit is decreased.

According to an aspect of the present disclosure, a power supply apparatus may include: a first power supply unit including a transformer switching and transforming an input power, and converting the input power into a first power and providing the first power to a main output terminal and a standby output terminal; a second power supply unit converting the input power into a second power and provide the second power as an operating power of the first power supply unit; and a main switching unit intermitting a supply of the first power from the first power supply unit to the main output terminal.

The main switching unit may include a bidirectional switching device.

The main switching unit may include first and second switches each having a reverse diode embedded therein, and a source of the first switch may be connected to a source of the second switch and a gate of the first switch may be connected to a gate of the second switch.

The main switching unit may be switched off in a standby mode and be switched on in a nominal mode.

The second power supply unit may include at least one of a flyback converter and a buck converter.

The first power supply unit may include: a primary side circuit unit including a primary side winding of the transformer and a plurality of primary side switching devices controlling a current flowing to the primary side winding of the transformer; and a secondary side circuit unit including a plurality of secondary side windings magnetically coupled to the primary side winding of the transformer and a plurality of secondary side switching devices conducting currents from the secondary side windings.

The primary side switching devices may include first and second switching devices connected to each other in series and third and fourth switching devices connected to each other in series, both ends of the first and second switching devices connected to each other in series may be connected to a power input terminal in parallel and both ends of the third and fourth switching devices connected to each other in series may be connected in parallel with the power input terminal, and the primary side winding of the transformer may be connected between a first node, a connection point between the first and second switching devices, and a second node, a connection point between the third and fourth switching devices.

The second power supply unit may include: an inductor device having one end connected to the first node; and a capacitor device connected between the other end of the inductor device and a ground.

The second power supply unit may further include a buck converter.

The second power supply unit may further include: an inductor device having one end connected to the first node; a switching device connected between the other end of the inductor device and a ground; and a diode device connected to the other end of the inductor device.

According to another aspect of the present disclosure, a power supply apparatus may include: a first power supply unit including a transformer switching and transforming an input power, and converting the input power into a first power and providing the first power to a main output terminal and a standby output terminal; a second power supply unit converting the input power into a second power and provide the second power as an operating power of the first power supply unit; and a main switching unit formed between an output terminal of the first power supply unit and a bidirectional switching device and intermitting a supply of the first power from the first power supply unit to the main output terminal.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. Throughout the drawings, the same or like reference numerals will be used to designate the same or like elements.

Figure 1:
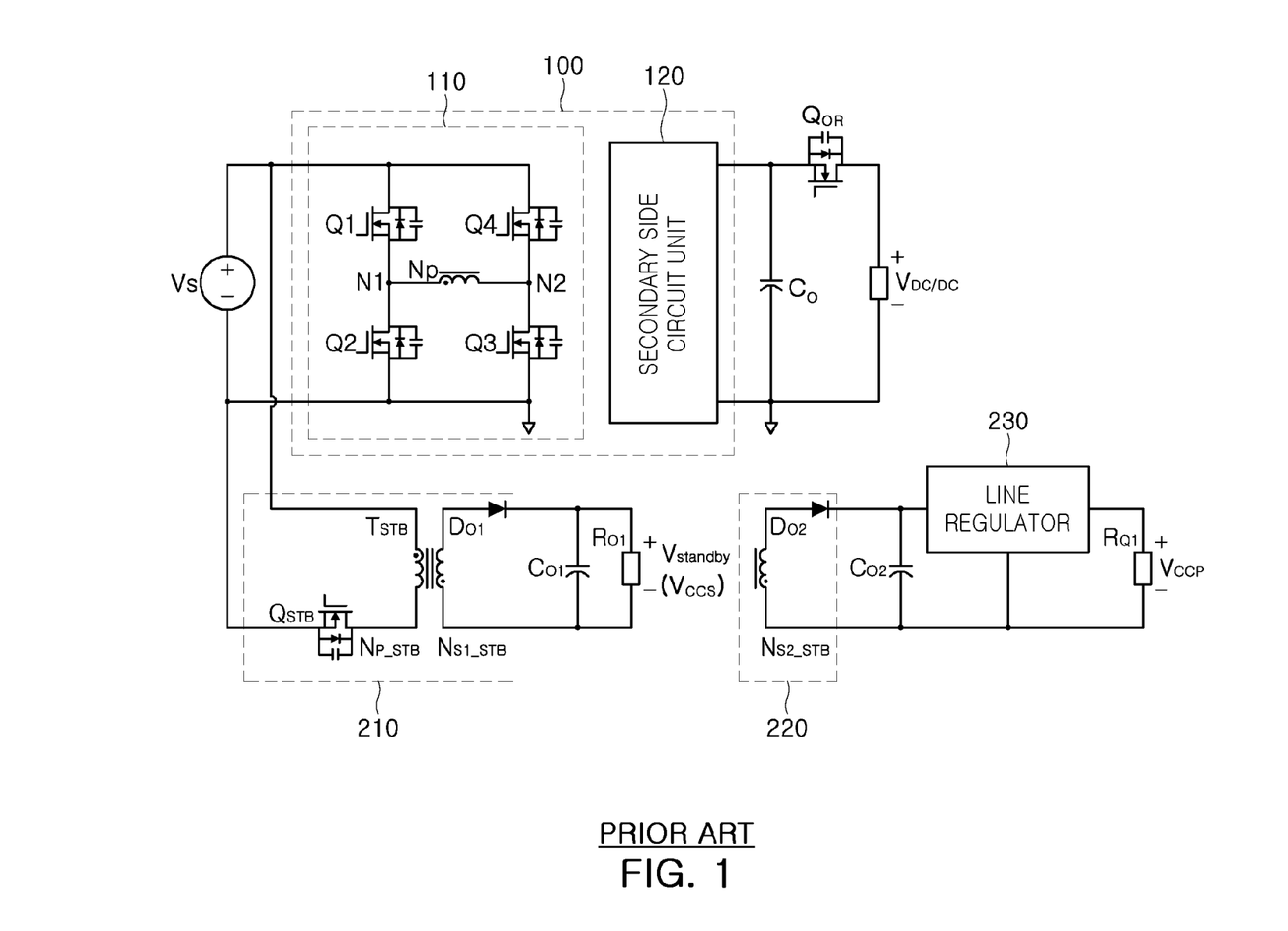
FIG. 1 is a diagram illustrating a general power supply apparatus for a server.

FIG. 1 is a diagram illustrating a general power supply apparatus for a server.

Referring to FIG. 1, the power supply apparatus may include a main power supply unit 100 and a standby power supply unit.

Here, an input power applied to the main power supply unit 100 and the standby power supply unit may be a power provided by a power factor correction unit. For example, the power factor correction unit may convert an alternating current (AC) power into a direct current (DC) power having a preset magnitude and provide the DC power to the main power supply unit 100 and the standby power supply unit.

The main power supply unit 100 may include a transformer switching and transforming the input power, and may convert the input power into a main power $V_{DC/DC}$ having a preset magnitude and provide the main power to a main output terminal $R_0$.

Meanwhile, the main power supply unit 100 according to an exemplary embodiment of the present disclosure may include a primary side circuit unit 110 and a secondary side circuit unit 120. Meanwhile, the main power supply unit 100 may be implemented in a form of a full-bridge DC/DC converter, as illustrated in FIG. 1.

The full-bridge DC/DC converter may have high efficiency due low current/voltage stress and zero voltage switching (ZVS), such that it may be very advantageous for power applications.

In detail, the full-bridge converter according to an exemplary embodiment of the present disclosure includes a bridge circuit $Q_1$ to $Q_4$ in which both ends of a first switching device $Q_1$ and a second switching device $Q_2$ connected to each other in series are connected in parallel with a power supply input terminal Vs and both ends of a third switching device $Q_3$ and a fourth switching device $Q_4$ connected to each other in series are connected in parallel with the power supply input terminal Vs, the primary side circuit unit 110 having a primary side winding $N_p$ connected between a first node $N_1$, a connection point between the first switching device $Q_1$ and the second switching device $Q_2$ and a second node $N_2$, a connection point between the third switching device $Q_3$ and the fourth switching device $Q_4$, the secondary side circuit unit 120 receiving a power from the primary side circuit unit 100, and a capacitor device $C_0$ and a transfer switch $Q_{OR}$ connected to the secondary side circuit unit 120.

Referring to FIG. 1, the power supply apparatus may include the standby power supply unit connected in parallel with the main power supply unit 100. The standby power supply unit may include a first flyback converter 210, a second flyback converter 220, a line regulator 230, and the like.

Referring to FIG. 1, the standby power supply unit may include the first flyback converter 210 converting the input power Vs into an operating power Vccs having a preset magnitude and providing the operating power Vccs to the main power supply unit 100 and the second flyback converter 220 converting the input power Vs into an operating power Vccp having a preset magnitude and providing the operating power Vccp to the main power supply unit 100. In addition, the flyback converter 210 may provide the power to a standby output terminal. In addition, the line regulator 230 may regulate a voltage output behind the second flyback converter 220.

Meanwhile, the first flyback converter 210 may include a switching device $Q_{STB}$, transformers $N_{P\_STB}$ and $N_{S1\_STB}$, and a diode $D_{01}$, as illustrated in FIG. 1. In addition, the second flyback converter 220 may include a switching device $Q_{STB}$, transformers $N_{P\_STB}$ and $N_{S2\_STB}$, and a diode $D_{02}$, as illustrated in FIG. 1.

As described above, the standby power supply unit may convert the input power into the operating power having the preset magnitude and provide the operating power to the main power supply unit 100, and may convert the input power into the power having the preset magnitude and provide the power to the standby output terminal.

That is, the standby power supply unit may provide a standby power $V_{standby}$ of a secondary side and control integrated circuit (IC) powers $V_{CCP}$ and $V_{CCS}$ of primary and secondary sides using a multi-winding flyback converter.

Meanwhile, in order to obtain the control IC power $V_{CCP}$ of the secondary side having a desired voltage level from a cross-regulated voltage output, the line regulator may be required. However, this may increase a cost and decrease an efficiency in a light load environment.

In addition, in this flyback converter, the switching device $Q_{STB}$ is hard-switched, and conduction loss is large due to a small duty ratio, such that an entire efficiency of the flyback converter may be low.

Further, a flyback transformer $T_{STB}$ of the standby power supply unit serves to supply both of the standby power and the control IC power, such that a size of the flyback transformer may become large. This may significantly deteriorate entire power density of a system and cause a spatial limitation of the power supply apparatus to deteriorate an entire efficiency of the power supply apparatus.

Figure 2:
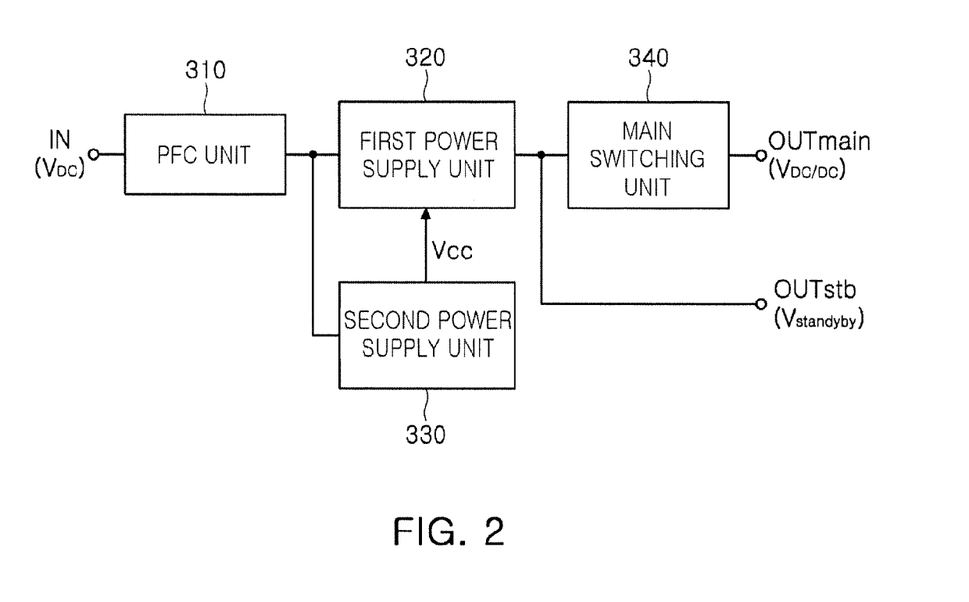
FIG. 2 is a block diagram of a power supply apparatus according to an exemplary embodiment of the present disclosure.

FIG. 2 is a block diagram of a power supply apparatus according to an exemplary embodiment of the present disclosure.

Referring to FIG. 2, a power supply apparatus according to an exemplary embodiment of the present disclosure may include a second power supply unit 330 converting a DC voltage Vdc into an operating voltage Vcc having a preset magnitude and providing the operating voltage Vcc to a first power supply unit 320, the first power supply unit 320 receiving the operating voltage Vcc from the second power supply unit 330, converting the DC voltage Vdc into a voltage having a preset magnitude, and providing the voltage to a main output terminal OUTmain and a standby output terminal OUTstb, and a main switching unit 340 intermitting supplying of a power from the first power supply unit 320 to the main output terminal OUTmain.

In addition, the power supply apparatus according to an exemplary embodiment of the present disclosure may include a power factor correction unit 300 converting an AC voltage Vac into the DC voltage Vdc having a preset magnitude and providing the DC voltage to the first power supply unit 320 and the second power supply unit 330.

Figure 3:
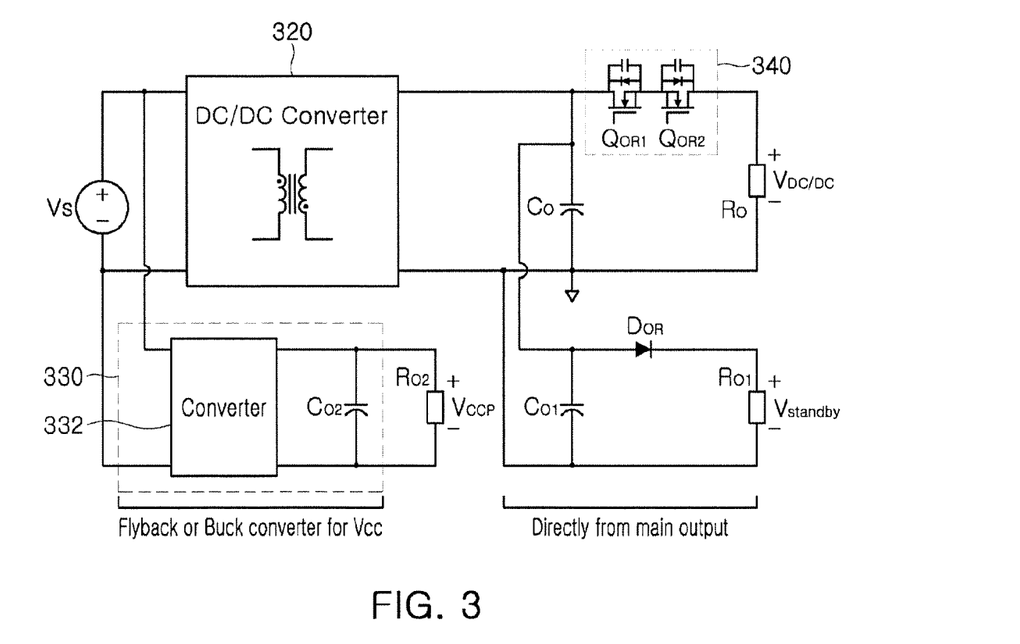
FIG. 3 is a circuit diagram of the power supply apparatus according to an exemplary embodiment of the present disclosure.

FIG. 3 is a circuit diagram of the power supply apparatus according to an exemplary embodiment of the present disclosure.

Referring to FIG. 3, the power supply apparatus according to an exemplary embodiment of the present disclosure may include the first power supply unit 320, the second power supply unit 330, and the main switching unit 340.

The first power supply unit 320 may include a transformer switching and transforming an input power Vs, and may convert the input power into a first power having a preset magnitude and provide the first power to a main output terminal $R_O$ and a standby output terminal $R_{O1}$.

The second power supply unit 330 may convert the input power Vs into a second power having a preset magnitude and provide the second power as an operating power Vcc of the first power supply unit.

The second power supply unit may include a converter 332, for example, at least one of a flyback converter and a buck converter.

The main switching unit 340 may be formed between an output terminal of the first power supply unit 320 and the main output terminal $R_O$ and may intermit supplying of a power from the first power supply unit 320 to the main output terminal. As illustrated in FIG. 3, the main switching unit 340 may be formed of a bidirectional switching device.

The main switching unit 340 may include first and second switches $Q_{OR1}$ and $Q_{OR2}$ each having a reverse diode embedded therein, as illustrated in FIG. 3. Here, a source of the first switch $Q_{OR1}$ may be connected to a source of the second switch $Q_{OR2}$, and a gate of the first switch may be connected to a gate of the second switch. Therefore, the first and second switches $Q_{OR1}$ and $Q_{OR2}$ may be simultaneously switched on or switched off to intermit the supplying of the power from the first power supply unit 320 to the main output terminal.

The power supply apparatus according to an exemplary embodiment of the present disclosure may use the flyback converter or the buck converter only to supply a driving power (for example, a control IC power). In addition, an output power of the first power supply unit (for example, a DC/DC converter) may be directly used as a standby power. For example, the power supply apparatus according to an exemplary embodiment of the present disclosure may be applied to an application in which a standby output voltage is the same as an output voltage of a DC/DC converter.

When comparing the power supply apparatus (See FIG. 1) according to the related art and the power supply apparatus (See FIG. 3) according to an exemplary embodiment of the present disclosure with each other, the power supply apparatus according to the related art may supply the standby power and the driving power using the flyback converter, while the power supply apparatus according to an exemplary embodiment of the present disclosure may use the flyback converter only to supply the driving power. Therefore, according to an exemplary embodiment of the present disclosure, a size of a transformer of the flyback converter may be decreased. Further, the power supply apparatus according to an exemplary embodiment of the present disclosure does not need to include a line regulator that has been present in the power supply apparatus according to the related art since a primary side driving power $V_{CCP}$ is directly controlled. Therefore, a volume of the power supply apparatus according to an exemplary embodiment of the present disclosure may be decreased. Therefore, a created space may be used to improve an efficiency of the DC/DC converter. Therefore, an entire efficiency of the power supply apparatus may be improved. For example, a capacitance of a link capacitor present at an input of the DC/DC converter is increased, whereby the efficiency of the DC/DC converter in a nominal mode may be improved.

In addition, when comparing the power supply apparatus (See FIG. 1) according to the related art and the power supply apparatus (See FIG. 3) according to an exemplary embodiment of the present disclosure with each other, a switching device $Q_{OR}$ formed of an ORing metal oxide semiconductor field effect transistor (MOSEFT) may be used in the power supply apparatus according to the related art, while a switching device (first and second switches $Q_{OR1}$ and $Q_{OR2}$) of which a bidirectional control is possible may be used in the power supply apparatus according to an exemplary embodiment of the present disclosure. Therefore, the first and second switches $Q_{OR1}$ and $Q_{OR2}$ may be switched off in a standby mode, thereby preventing an output of the first power supply unit from appearing in the main output terminal $R_O$.

Figure 4A:
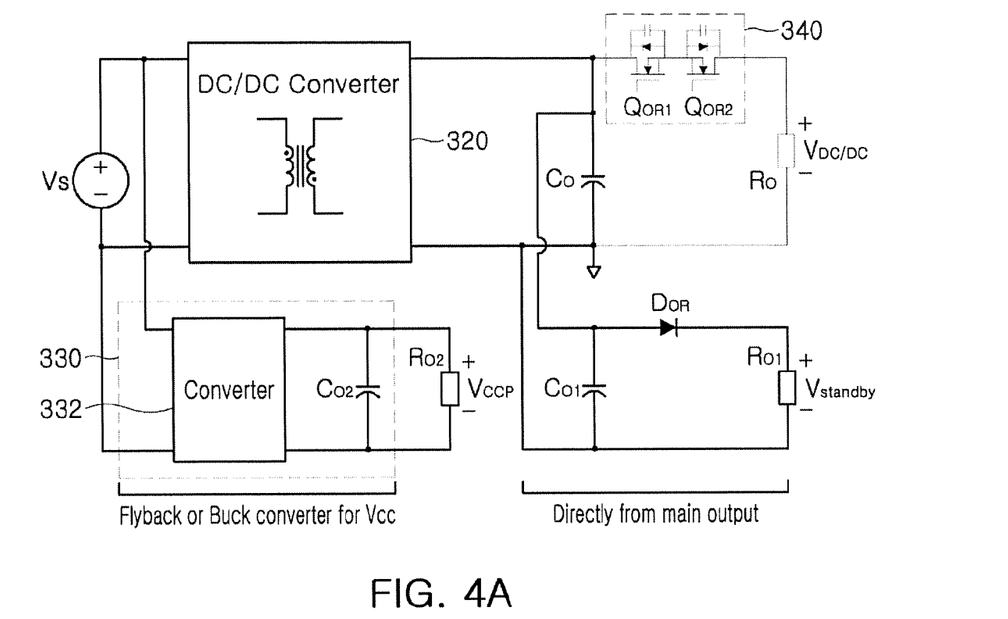
FIGS. 4A and 4B are diagrams illustrating circuit operations of the power supply apparatus according to an exemplary embodiment of the present disclosure in a standby mode and a nominal mode.
Figure 4B:
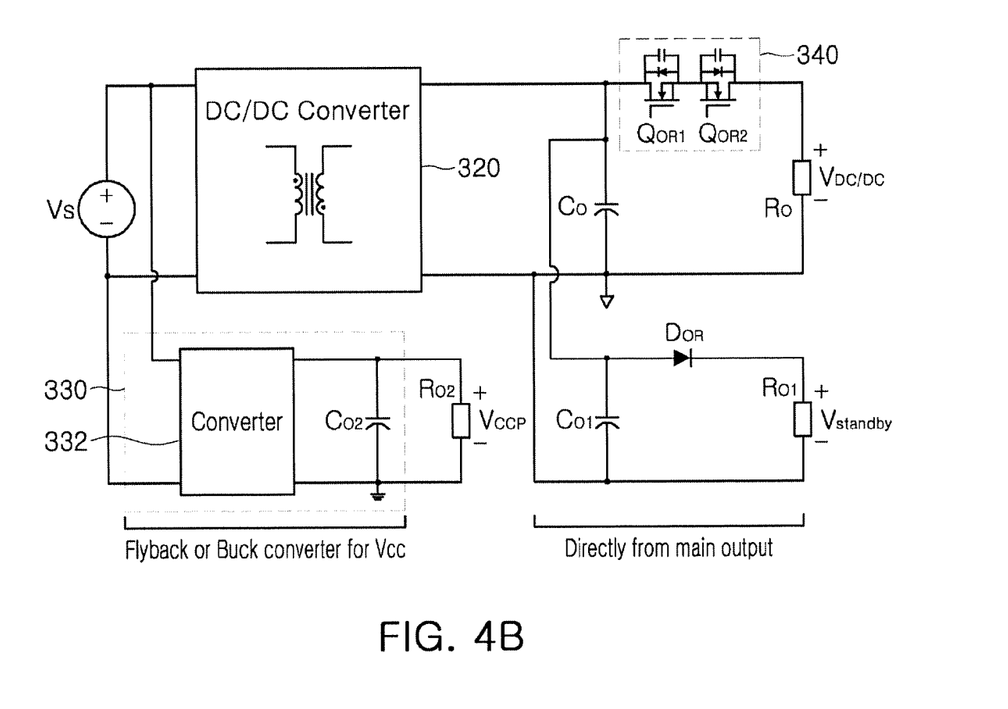

FIGS. 4A and 4B are diagrams illustrating circuit operations of the power supply apparatus according to an exemplary embodiment of the present disclosure in a standby mode and a nominal mode.

FIG. 4A shows a circuit operation in a standby mode.

FIG. 4B shows a circuit operation in a nominal mode.

Referring to FIGS. 4A and 4B, it may be confirmed that the main switching unit 340 is controlled to be switched off in the standby mode and to be switched on in the nominal mode.

Therefore, the main switching unit 340 may prevent the output of the first power supply unit from appearing in the main output terminal $R_O$ in the standby mode and supply the power to the main output terminal $R_O$ only in the nominal mode.

Meanwhile, the first power supply unit 320 may supply the power to the standby output terminal $R_{O1}$ in the standby mode and the nominal mode. That is, since the standby output terminal $R_{O1}$ receives the power from the first power supply unit 320, an entire efficiency of the system may be improved.

Figure 5:
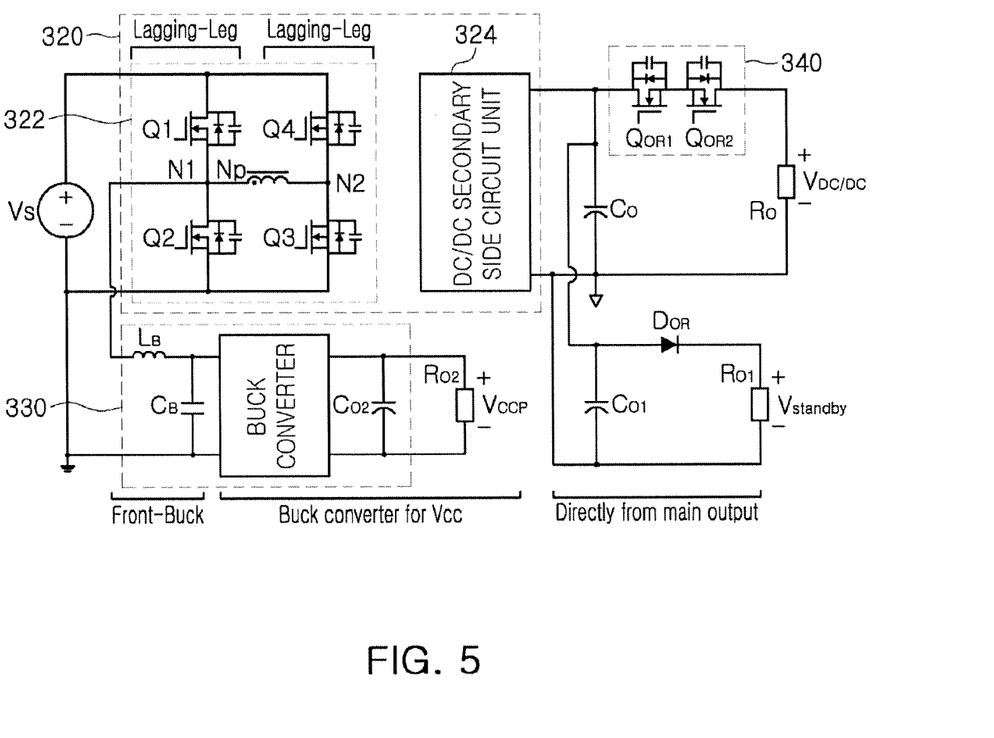
FIG. 5 is a circuit diagram of a power supply apparatus according to another exemplary embodiment of the present disclosure.

FIG. 5 is a circuit diagram of a power supply apparatus according to another exemplary embodiment of the present disclosure.

Referring to FIG. 5, the power supply apparatus according to another exemplary embodiment of the present disclosure may include a first power supply unit 320, a second power supply unit 330, and a main switching unit 340.

The first power supply unit 320 may include a primary side circuit unit 322 including a primary side winding of a transformer and a plurality of primary side switching devices controlling a current flowing to the primary side winding of the transformer and a secondary side circuit unit 324 including a plurality of secondary side windings magnetically coupled to the primary side winding of the transformer and a plurality of secondary side switching devices conducting currents from the secondary side windings.

Here, the primary side switching devices may include first and second switching devices $Q_1$ and $Q_2$ connected to each other in series and third and fourth switching devices $Q_3$ and $Q_4$ connected to each other in series.

Here, both ends of the first and second switching devices $Q_1$ and $Q_2$ connected to each other in series may be connected to a power input terminal Vs in parallel, and both ends of the third and fourth switching devices $Q_3$ and $Q_4$ connected to each other in series may be connected in parallel with the power input terminal Vs.

In addition, the primary side winding Np of the transformer may be connected between a first node $N_1$, a connection point between the first and second switching devices $Q_1$ and $Q_2$ and a second node $N_2$, a connection point between the third and fourth switching devices $Q_3$ and $Q_4$.

Meanwhile, the first and second switching devices $Q_1$ and $Q_2$ connected to each other in series may be commonly called a lagging leg, and the third and fourth switching devices $Q_3$ and $Q_4$ connected to each other in series may be commonly called a leading leg.

The second power supply unit illustrated in FIG. 5 may include a front-buck converter and a buck converter.

Referring to FIG. 5, the second power supply unit 330 may further include an inductor device $L_B$ having one end connected to the first node $N_1$ and a capacitor device $C_B$ connected between the other end of the inductor device $L_B$ and a ground. In addition, the second power supply unit 330 may further include a buck converter behind the capacitor device $C_B$.

In a lagging leg of a primary side of a general DC/DC converter, zero voltage switching (ZVS) performance may be changed depending on a load, and the lighter the load, the larger the switching loss.

Therefore, in the power supply apparatus according to another exemplary embodiment of the present disclosure, the inductor device $L_B$ is connected to the lagging leg to increase a zero voltage switching range of the lagging leg to an entire load, whereby switching loss may be significantly decreased. In addition, since an output of the front buck converter configured of the inductor device $L_B$ having one end connected to the first node $N_1$ and the capacitor device $C_B$, connected between the other end of the inductor device $L_B$ and the ground is a half (Vs/2) of a power input, voltage stress and switching loss of the buck converter may be decreased.

Figure 6A:
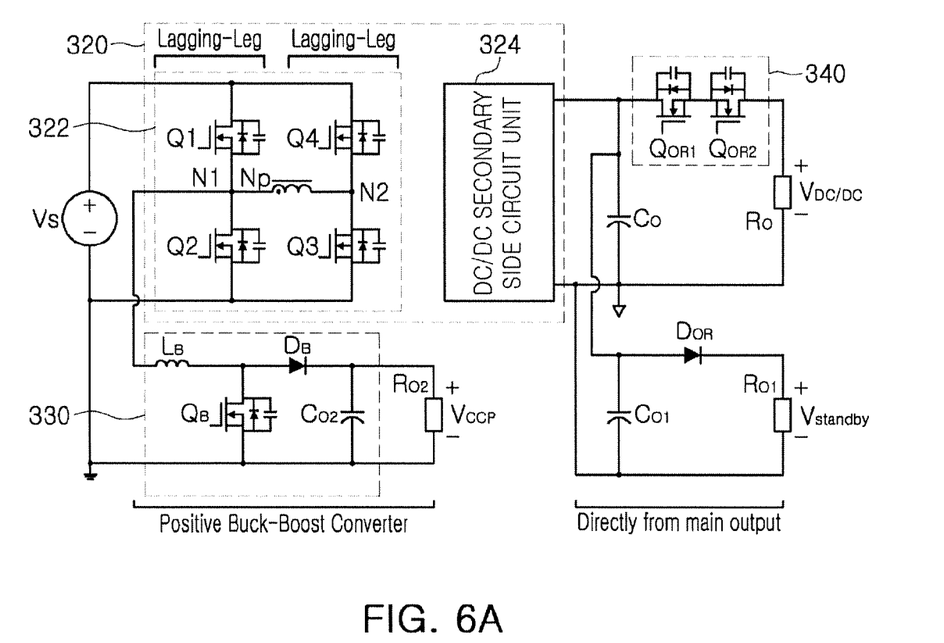
FIG. 6A is a circuit diagram of a power supply apparatus according to another exemplary embodiment of the present disclosure.
Figure 6B:
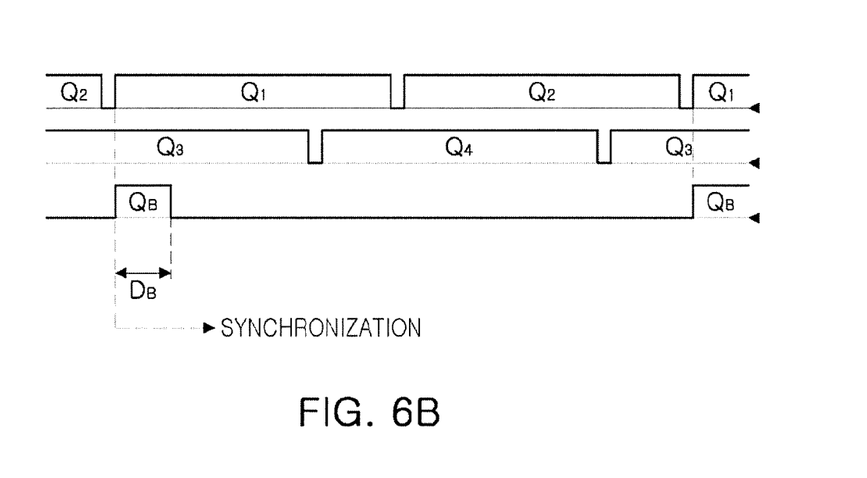
FIG. 6B is a diagram illustrating a control waveform of the power supply apparatus illustrated in FIG. 6A.

FIG. 6A is a circuit diagram of a power supply apparatus according to another exemplary embodiment of the present disclosure, and FIG. 6B is a diagram illustrating a control waveform of the power supply apparatus illustrated in FIG. 6A.

A second power supply unit illustrated in FIG. 6A may include a positive buck converter. That is, referring to FIG. 6A, the second power supply unit 330 may include an inductor device $L_B$ having one end connected to the first node, a switching device $Q_B$ connected between the other end of the inductor device $L_B$ and a ground, and a diode device $D_B$ connected to the other end of the inductor device.

Referring to FIGS. 6A and 6B, the switching device $Q_B$ is synchronized with the first switching device $Q_1$, such that a pulse width may be controlled. Therefore, according to the present exemplary embodiment, zero voltage switching characteristics of the switching device $Q_B$ may be improved, and the operating power $V_{CCP}$ may be controlled by controlling the pulse width.

With the power supply apparatus illustrated in FIGS. 5 through 6B, an efficiency of the second power supply unit used to supply the operating power $V_{CCP}$ may be improved.

As described above, in the case in which the power supply apparatus according to an exemplary embodiment of the present disclosure is used in a server, a volume of the operating power supply unit may be significantly decreased as compared with the power supply apparatus for a server according to the related art. Therefore, the efficiency of the power supply apparatus may be significantly improved.

As set forth above, according to exemplary embodiments of the present disclosure, a power supply apparatus having an improved power efficiency may be provided.

In addition, according to exemplary embodiments of the present disclosure, a power supply apparatus in which a volume of an operating power supply unit is decreased may be provided.

While exemplary embodiments have been shown and described above, it will be apparent to those skilled in the art that modifications and variations could be made without departing from the spirit and scope of the present disclosure as defined by the appended claims.

What is claimed is:

1. A power supply apparatus comprising:
    a first power supply unit including a transformer switching and transforming an input power, and converting the input power into a first power and providing the first power to a main output terminal and a standby output terminal;
    a second power supply unit converting the input power into a second power and providing power only to the first power supply unit as an operating power of the first power supply unit; and
    a main switching unit intermitting a supply of the first power from the first power supply unit to the main output terminal.

2. The power supply apparatus of claim 1, wherein the main switching unit includes a bidirectional switching device.

3. The power supply apparatus of claim 2, wherein the main switching unit is switched off in a standby mode and is switched on in a nominal mode.

4. The power supply apparatus of claim 1, wherein the main switching unit includes first and second switches each having a reverse diode embedded therein, and
    a source of the first switch is connected to a source of the second switch, and a gate of the first switch is connected to a gate of the second switch.

5. The power supply apparatus of claim 1, wherein the second power supply unit includes at least one of a flyback converter and a buck converter.

6. The power supply apparatus of claim 1, wherein the first power supply unit includes:
    a primary side circuit unit including a primary side winding of the transformer and a plurality of primary side switching devices controlling a current flowing to the primary side winding of the transformer; and
    a secondary side circuit unit.

7. The power supply apparatus of claim 6, wherein the primary side switching devices include first and second switching devices connected to each other in series and third and fourth switching devices connected to each other in series, both ends of the first and second switching devices connected to each other in series are connected to a power input terminal in parallel, and both ends of the third and fourth switching devices connected to each other in series are connected in parallel with the power input terminal, and the primary side winding of the transformer is connected between a first node, a connection point between the first and second switching devices, and a second node, a connection point between the third and fourth switching devices.

8. The power supply apparatus of claim 7, wherein the second power supply unit includes:

an inductor device having one end connected to the first node; and a capacitor device connected between the other end of the inductor device and a ground.

9. The power supply apparatus of claim 8, wherein the second power supply unit further includes a buck converter.

10. The power supply apparatus of claim 7, wherein the second power supply unit further includes:

an inductor device having one end connected to the first node;

a switching device connected between the other end of the inductor device and a ground; and a diode device connected to the other end of the inductor device.

11. A power supply apparatus comprising:

a first power supply unit including a transformer switching and transforming an input power, and converting the input power into a first power and providing the first power to a main output terminal and a standby output terminal;

a second power supply unit converting the input power into a second power and providing power only to the first power supply unit as an operating power of the first power supply unit; and a bidirectional switching device formed between an output terminal of the first power supply unit and the main output terminal and intermitting a supply of the first power from the first power supply unit to the main output terminal.

* * * * *